United States Patent Office 2,846,628
Patented Aug. 5, 1958

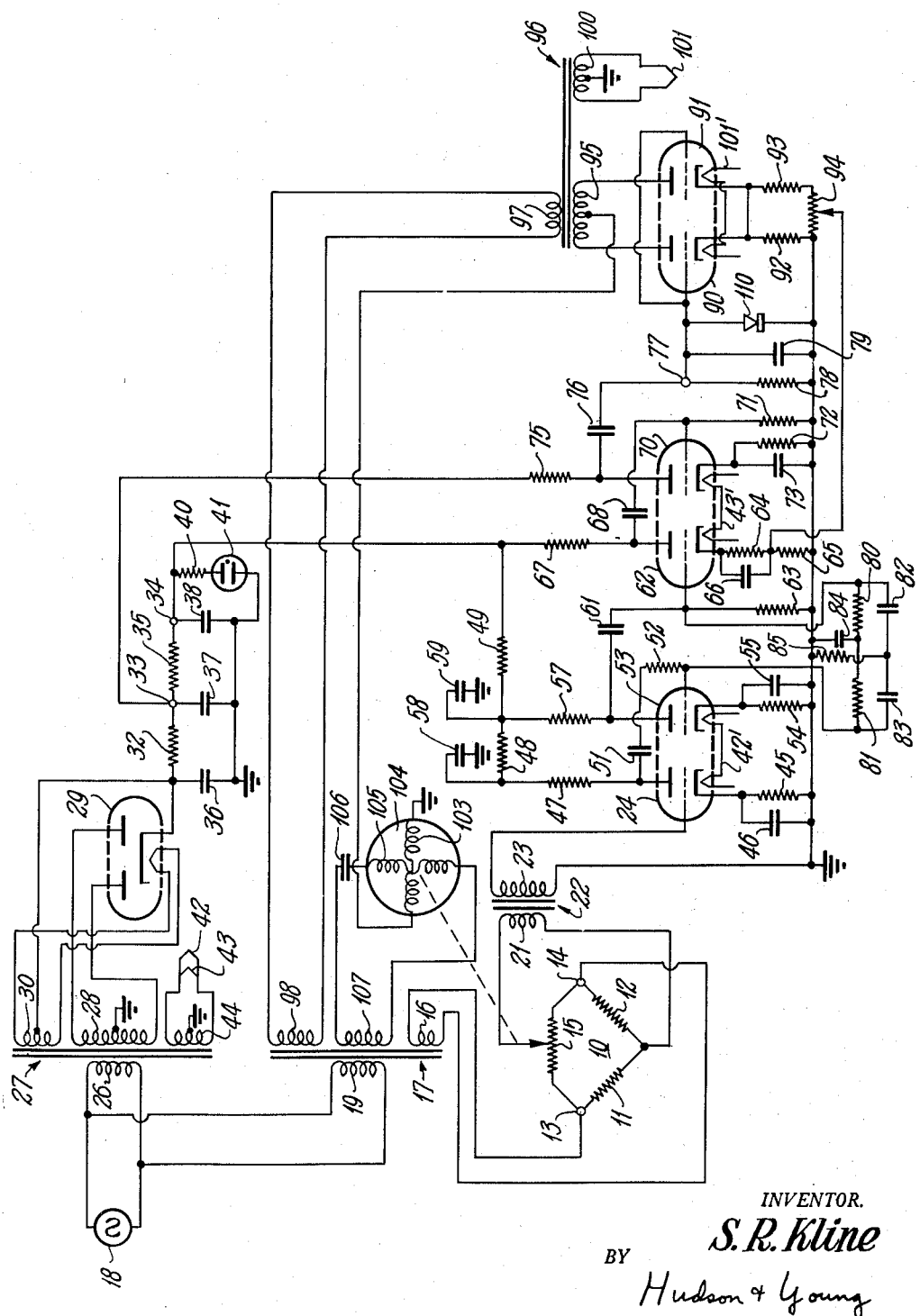

2,846,628

ELECTRICAL SERVO SYSTEM

Sidney R. Kline, El Paso, Tex., assignor to Phillips Petroleum Company, a corporation of Delaware Application October 18, 1954, Serial No. 462,835

7 Claims. (Cl. 318—28)

This invention relates to apparatus for measuring and/or controlling a variable condition. In one specific aspect it relates to apparatus for improving the operation of electrical servomotors which are energized by the output signal of an electronic amplifier.

Various types of servo systems are known for detecting changes in magnitude of a measured condition and regulating a suitable control in response thereto to restore the measured condition to a preselected value. Such measured conditions may be mechanical, chemical, electrical or physical, for example. One common servo system for this purpose includes transducing means to convert the measured condition into a corresponding alternating current electrical signal. This signal is amplified and applied to the control grids of a pair of power amplifying tubes. The anodes of the two tubes are connected to the respective end terminals of the secondary winding of a transformer. The center tap of the transformer winding is connected through the first winding of a two phase reversible motor back to the cathodes of the two power tubes. The second winding of the reversible motor is energized from a voltage source which also energizes the primary winding of the transformer. The voltage applied to the primary winding of the transformer is maintained either in phase with or 180° out of phase with the electrical signal applied to the two control grids, and the voltages applied to the two windings of the reversible motor are either 90° or 270° out of phase with one another. The drive shaft of the reversible motor is connected to a control variable which regulates the magnitude of the measured quantity. In the absence of an electrical signal being applied to the control grids of the two power tubes, the motor remains stationary. However, any unbalance signal applied to the two control grids results in rotation of the motor in either a forward or reverse direction, depending upon the phase of the unbalance signal.

In servo systems of this type it is common practice to bias the power tubes such that they are conductive alternately even in the absence of an unbalance signal being applied to the two control grids. This results in a signal being applied to the first motor winding which is of a frequency twice the frequency of the voltage applied to the second motor winding. Such a signal does not drive the motor. However, the resulting current flow does heat the power tubes and the motor. This is detrimental when an accurate control system is desired or when the apparatus is contained in a small explosion-proof housing, as is common practice with control operations in the chemical and petroleum industries.

In accordance with the present invention, an improved circuit is provided for use with servo systems of the type described. This circuit includes a degenerative feedback network connected between the power tubes and the amplifier. This feedback network is connected to an appropriate point in the amplifier such that the feedback signal appears on the control grids of the power tubes 180° out of phase with the potential on the cathodes of the tubes. This feedback signal thus reduces the current flow through the two tubes in the absence of an unbalance signal being applied to the control grids of the two tubes. A voltage limiting circuit is provided to maintain the potential on the control grids of the power tubes within predetermined limits with respect to the potential on the cathodes of the tubes.

Accordingly, it is an object of this invention to provide an improved electrical servo system for use in measuring and/or control operations.

Another object is to provide circuit means to reduce the current flow through the power tubes and motor of a servo system in the absence of an unbalance signal being applied thereto.

A further object is to provide a servo amplifier system having improved stability.

Other objects, advantages and features of this invention should become apparent from the following detailed description taken in conjunction with the accompanying drawing which illustrates schematically the improved control circuit of this invention.

Referring now to the drawing in detail there is shown an electrical bridge network 10 comprising first and second resistance elements 11 and 12 connected in series relation between first opposite terminals 13 and 14. The end terminals of a potentiometer 15 are also connected to respective terminals 13 and 14. Bridge terminal 13 is connected to one end terminal of a secondary winding 16 of a transformer 17, and bridge terminal 14 is connected to the second end terminal of transformer winding 16. A voltage source 18 is connected across the end terminals of the primary winding 19 of a transformer 17. For purposes of description, it will be assumed that voltage source 18 provides alternating current at a frequency of sixty cycles per second, although the invention is not limited to such a frequency. The contactor of potentiometer 15 is connected to one end terminal of the primary winding 21 of a transformer 22. The junction between resistance elements 11 and 12 is connected to the second end terminal of transformer winding 21.

Bridge circuit 10 is representative of a typical transducing element to convert a measured variable into an alternating electrical signal. For example, resistance element 11 can be positioned in a region of temperature to be measured. As a second example, resistance elements 11 and 12 can constitute thermistors in an optical analyzer of the type described in U. S. Patent 2,579,825. Furthermore, the transducing element need not be an electrical bridge circuit; it can be any type of element capable of providing an electrical signal representative of a quantity to be measured.

One end terminal of the secondary winding 23 of transformer 22 is connected to the control grid of a triode 24 which forms the first stage of a multi-stage amplifier. The second end terminal of transformer winding 23 is connected to ground.

The operating potentials for the amplifier are obtained from a power supply circuit illustrated in the upper portion of the drawing. The primary winding 26 of a transformer 27 is energized by voltage source 18. The end terminals of a first secondary winding 28 of transformer 27 are connected to the respective anodes of a double diode 29. The common cathode of double diode 29 is connected to the center tap of a second secondary winding 30 of transformer 27. The end terminals of transformer winding 30 are connected to the heater filament of double diode 29. The center tap of transformer winding 28 is connected to ground. The cathode of double diode 29 is connected through a first filter resistor 32 to a first potential terminal 33. Terminal 33 is connected to a second potential terminal 34 through a second filter resistor 35. A first filter capacitor 36 is connected between ground and the cathode of double diode 29; a second filter capacitor 37 is connected between terminal 33 and ground; and a third filter capacitor 38 is connected between terminal 34 and ground. A resistor 40 and a voltage regulating tube 41 are connected in series relation between terminal 34 and ground. Double diode 29 thus serves as a full wave rectifier with the output voltage therefrom being filtered to provide steady positive potentials at terminals 33 and 34. The end terminals of a third secondary winding 44 of transformer 27 are connected to filament heaters 43 and 42 which are employed in the amplifier described hereinafter. The center tap of transformer winding 44 is connected to ground.

The cathode of triode 24 is connected to ground through a resistor 45 which is shunted by a capacitor 46. The anode of triode 24 is connected to potential terminal 34 through series connected resistors 47, 48, and 49. The anode of triode 24 is also connected through a capacitor 51 and a resistor 52 to the control grid of a second triode 53. The cathode of triode 53 is connected to ground through a resistor 54 which is shunted by a capacitor 55. The anode of triode 53 is connected to potential terminal 34 through series connected resistors 57 and 49. The junction between resistors 47 and 48 is connected to ground through a capacitor 58 and the junction between resistors 48 and 49 is connected to ground through a capacitor 59. The anode of triode 53 is also connected through a capacitor 61 to the control grid of a third triode 62, the control grid of triode 62 being connected to ground through a resistor 63. The cathode of triode 62 is connected to ground through series connected resistors 64 and 65, the former being shunted by a capacitor 66. The anode of triode 62 is connected to potential terminal 34 through a resistor 67. The anode of triode 62 is also connected through a capacitor 68 to the control grid of a fourth triode 70, the control grid of triode 70 being connected to ground through a resistor 71. The cathode of triode 70 is connected to ground through a resistor 72 which is shunted by a capacitor 73. The anode of triode 70 is connected to potential terminal 33 through a resistor 75. The anode of triode 70 is also connected through a capacitor 76 to an output terminal 77 of the four-stage amplifier. Terminal 77 is connected to ground through a resistor 78 which is shunted by a capacitor 79.

A tuned feedback network is connected between the control grid of triode 62 and the control grid of triode 53. This network includes a pair of series connected resistors 80 and 81 which is shunted by a pair of series connected capacitors 82 and 83. The junction between the resistors 80 and 81 is connected to ground through a capacitor 84, and the junction between capacitors 82 and 83 is connected to ground through a resistor 85. This feedback network thus constitutes a parallel-T filter which minimizes the transmission through the amplifier of stray voltages of frequencies other than sixty cycles. The filter is tuned to sixty cycles to present high impedance to sixty cycle signals and relatively low impedance to signals of other frequencies. Accordingly, at frequencies other than sixty cycles, which the amplifier would normally pass, the parallel-T filter provides some transmission and thereby applies degenerative feedback to the control grid of triode 53. Respective values of the circuit components which provide such transmission of only sixty cycle signals are as follows: capacitors 82 and 83, 0.01 microfarad each; capacitor 84, 0.02 microfarad; resistors 80 and 81, 265,000 ohms each; and resistor 85, 132,500 ohms.

Amplifier output terminal 77 is connected to the control grids of power output triodes 90 and 91. The cathodes of triodes 90 and 91 are connected to one another and to ground through a resistor 92. Resistor 92 is shunted by a series relation resistor 93 and a potentiometer 94. The contactor of potentiometer 94 is connected to the junction between resistors 64 and 65 in the cathode circuit of triode 62. The anodes of triodes 90 and 91 are connected to respective end terminals of a secondary winding 95 of a transformer 96. The primary winding 97 of transformer 96 is connected across a second secondary winding 98 of transformer 17. Transformer windings 16 and 95 are thus energized from a common source of voltage which results in the voltages appearing across these two transformer windings being in phase with one another. As long as there is no phase shift through the amplifier, any unbalance signal applied to the control grids of triodes 90 and 91 is in phase with or 180° out of phase with the voltages applied to the respective anodes of these two triodes. The end terminals of a second secondary winding 100 of transformer 96 are connected to a filament heater 101 for triodes 90 and 91. Filament heater 42 forms a part of triodes 24 and 53 and filament heater 43 forms a part of triodes 62 and 70, these heaters being indicated in the triodes by corresponding primed numerals.

The center tap of transformer winding 95 is connected to one end terminal of the first winding 103 of a two-phase reversible motor 104. The second terminal of winding 103 is connected to ground. The first terminal of the second winding 105 of motor 104 is connected through a capacitor 106 to the first end terminal of a third secondary winding 107 of transformer 17, the second end terminal of transformer winding 107 being connected to the second terminal of motor winding 105.

For purposes of description it will be assumed that the bridge circuit 10 initially is in a balanced condition which results in a zero potential difference appearing between the contactor of potentiometer 15 and the junction between resistance elements 11 and 12. Under this condition, no current flows through the primary winding 21 of transformer 22 and, accordingly, there is no unbalance signal applied to the control grids of triodes 90 and 91. However, even in the absence of such an unbalance signal, triodes 90 and 91 are conductive during alternate half cycles of the voltage induced across transformer winding 95. During the first half cycle, the anode of triodes 90 is positive so that triode 90 conducts. During the second half cycle, the anode of triode 91 is positive such that triode 91 conducts. The output signal from these two triodes thus constitutes substantially equal positive pulses at a frequency of 120 cycles per second. This signal does not rotate motor 104, but does heat triodes 90 and 91 and motor 104.

In order to reduce this heating effect, a portion of the voltage drop across potentiometer 94 is applied to the junction between resistors 64 and 65 in the cathode circuit of triode 62. The positive potential at the contactor of potentiometer 94, which is a function of the total curren flow through the two triodes 90 and 91, serves to increase the potential applied to the cathode of triode 62. This decreases the current flow through triode 62 and thereby increases the potential on the anode thereof, which potential is applied to the control grid of triode 70 to increase the current flow therethrough. The potential on the anode of triode 70 is thereby lowered, and this lowered potential is in turn applied to the control grids of triodes 90 and 91 to decrease the current flows therethrough. The feedback network thus provides degenerative feedback so that the current flow through triodes 90 and 91 is reduced in the absence of an unbalanced signal being applied to the control grids thereof.

While the contactor of potentiometer 94 is shown connected to the cathode circuit of triode 62, the connection can be made at various other points in the amplifier circuit and still retain the degenerative feedback effect. Such other points include the control grids of triodes 53 and 70 and the cathode of triode 24.

If the resistance of element 11 changes with respect to the resistance of element 12, a potential difference appears between the contactor of potentiometer 15 and the junction between resistance elements 11 and 12. This potential difference is amplified with the result that an unbalance signal is applied to the control grids of triodes 90 and 91, such unbalance signal being either in phase with or 180° out of phase with the voltage applied to the anodes of the tubes. During the half cycle of applied voltage when the anode of triode 90 is positive, increased current flows through triode 90 if the unbalance signal is positive. During the second half cycle of applied voltage, the anode of triode 91 is positive while the control grids of these two triodes are negative. This reduces the current flow through triode 90 to a value less than the current flow through this triode in the absence of an unbalance signal. Thus, the output signal from the two triodes contains a component having a frequency of sixty cycles, and this signal in turn rotates motor 104 to move the contactor of potentiometer 15 until there is no longer a potential difference between such point and the junction between resistance elements 11 and 12. The direction of rotation of motor 104 is a function of the relative potential difference between the output terminals of bridge 10. In either event motor 104 is rotated in a direction to restore the bridge to a balanced condition. While the feedback network of this invention tends to reduce the gain of triodes 90 and 91, this is not a serious disadvantage because the gain of the amplifier can be made sufficient to accommodate any decrease in the gain of the output tubes. The output signal from triodes 90 and 91 remains sufficient to rotate motor 104 to restore a balanced condition.

A rectifier 110 is connected between the control grids of triodes 90 and 91 and ground. This rectifier functions as a current limiting device, whereby current flows between the control grids and ground if the potential applied to these control grids exceeds a preselected value. This prevents excessive current flow through the tubes in the event of a large unbalance signal, because such a signal is grounded through rectifier 110.

While the invention has been described in conjunction with a present preferred embodiment it should be apparent that the invention is not limited thereto.

What is claimed is:

1. An electrical servo system including an alternating current voltage source; a reversible motor having first and second windings; means applying said voltage source across the first winding of said motor; an electronic amplifier; a first electron tube having an anode, a cathode and a control grid; a second electron tube having an anode, a cathode and a control grid; a transformer; means applying said voltage source across the primary winding of said transformer; means connecting the end terminals of the secondary winding of said transformer to the anodes of said first and second tubes, respectively; means connecting one output terminal of said amplifier to the control grids of said first and second tubes; circuit means connecting the second output terminal of said amplifier to the cathodes of said first and second tubes; means connecting one terminal of the second winding of said motor to a center tap on the secondary winding of said transformer and the second terminal of the second winding of said motor to said second output terminal of said amplifier; phase shifting means connected in circuit with one of said motor windings so that the voltages applied to said two motor windings are 90° out of phase with one another; and a degenerative feedback network to pass direct current connected between said circuit means and a point in said amplifier of proper phase to reduce the potential difference between the grids and cathodes of said tubes responsive to current flow through said circuit means.

2. The combination in accordance with claim 1 further comprising unidirectional current passage means connected between the control grids of said tubes and said second output terminal of said amplifier, said unidirectional current passage means becoming operative to pass electron flow between said second output terminal and said control grids when the potential difference therebetween exceeds a predetermined value.

3. An electrical servo system including an alternating current voltage source; a reversible motor having first and second windings; means applying said voltage source across the first winding of said motor; an electronic amplifier; a first electron tube having an anode, a cathode and a control grid; a second electron tube having an anode, a cathode and a control grid; a transformer; means applying said voltage source across the primary winding of said transformer; means connecting the end terminals of the secondary winding of said transformer to the anodes of said first and second tubes, respectively; means connecting one output terminal of said amplifier to the control grids of said first and second tubes; a voltage dividing network connecting the second output terminal of said amplifier to the cathodes of said first and second tubes; means connecting one terminal of the second winding of said motor to a center tap on the secondary winding of said transformer and the second terminal of the second winding of said motor to said second output terminal of said amplifier; phase shifting means connected in circuit with one of said motor windings so that the voltages applied to said two motor windings are 90° out of phase with one another; and a degenerative feedback network to pass direct current connected between a point on said voltage dividing network and a point in said amplifier of proper phase to reduce the potential difference between the grids and cathodes of said tubes responsive to current flow through said circuit means.

4. An electrical servo system including an alternating current voltage source; a reversible motor having first and second windings; means applying said voltage source across the first winding of said motor; a two stage amplifier comprising first and second electron tubes each having an anode, a cathode and a control grid, means connecting the control grid of said first tube to one input terminal of said amplifier, a first resistance network connecting the cathode of said first tube to the second input terminal of said amplifier, and means connecting the anode of said first tube to the control grid of said second tube, the anode of said second tube comprising one output terminal of said amplifier, said second input terminal of said amplifier also comprising the second output terminal of said amplifier; third and fourth electron tubes each having an anode, a cathode and a control grid; a transformer; means applying said voltage source across the primary winding of said transformer; means connecting the end terminals of the secondary winding of said transformer to the anodes of said third and fourth tubes, respectively; means connecting said one output terminal of said amplifier to the control grids of said third and fourth tubes; a second resistance network connecting said second output terminal of said amplifier to the cathodes of said third and fourth tubes; means connecting one terminal of the second winding of said motor to a center tap on the secondary winding of said transformer and the second terminal of the second winding of said motor to said second output terminal of said amplifier; phase shifting means connected in circuit with one of said motor windings so that the voltages applied to said two motor windings are 90° out of phase with one another; and a lead connected between a point on said first resistance network and a point on said second resistance network to form a feedback path.

5. The combination in accordance with claim 4 further comprising unidirectional current passage means connected between the control grids of said third and fourth tubes and said second output terminal of said amplifier, said unidirectional current passage means becoming operative to pass electron flow between said second output terminal and said control grids when the potential difference therebetween exceeds a predetermined value.

6. An electrical servo system including an alternating current voltage source; a reversible motor having first and second windings; means applying said voltage source across the first winding of said motor; a two stage amplifier comprising first and second electron tubes each having an anode, a cathode and a control grid, means connecting the control grid of said first tube to one input terminal of said amplifier, a first resistance network connecting the cathode of said first tube to the second input terminal of said amplifier, and means connecting the anode of said first tube to the control grid of said second tube, the anode of said second tube comprising one output terminal of said amplifier, said second input terminal of said amplifier also comprising the second output terminal of said amplifier; third and fourth electron tubes each having an anode, a cathode and a control grid; a transformer; means applying said voltage source across the primary winding of said transformer; means connecting the end terminals of the secondary winding of said transformer to the anodes of said third and fourth tubes, respectively; means connecting said one output terminal of said amplifier to the control grids of said third and fourth tubes; a second resistance network connecting said second output terminal of said amplifier to the cathodes of said third and fourth tubes; means connecting one terminal of the second winding of said motor to a center tap on the secondary winding of said transformer and the second terminal of the second winding of said motor to said second output terminal of said amplifier; phase shifting means connected in circuit with one of said motor windings so that the voltages applied to said two motor windings are 90° out of phase with one another; and means connected between said first and second resistance networks to pass direct current.

7. An electrical servo system including an alternating current voltage source; a reversible motor having first and second windings; means applying said voltage source across the first winding of said motor, an electronic amplifier; a first electron tube having an anode, a cathode, and a control grid; a second electron tube having an anode, a cathode, and a control grid; a transformer; means applying said voltage source across the primary winding of said transformer; means connecting the end terminals of the secondary winding of said transformer to the anodes of said first and second tubes, respectively; means connecting one output terminal of said amplifier to the control grids of said first and second tubes; means connecting one terminal of the second winding of said motor to a center tap on the secondary winding of said transformer and the second terminal of the second winding of said motor to said second output terminal of said amplifier; phase shifting means connected in circuit with one of said motor windings so that the voltages applied to said two motor windings are 90° out of phase with one another; a resistor connected between said second output terminal and the cathodes of said two tubes; a potentiometer; means connecting the end terminals of said potentiometer to the respective end terminals to said resistor; and means connecting the contactor of said potentiometer to a point in said amplifier of proper phase to reduce the potential difference between the grids and cathodes of said tubes in response to current flow through said tubes, thereby forming a degenerative feedback network.

References Cited in the file of this patent

UNITED STATES PATENTS

| | | |
|---|---|---|
| 2,286,442 | Shock | June 16, 1942 |
| 2,426,711 | Shaffer | Sept. 2, 1947 |
| 2,446,563 | Upton | Aug. 10, 1948 |
| 2,475,576 | Wild et al. | July 5, 1949 |
| 2,528,017 | Stanton | Oct. 31, 1950 |
| 2,553,597 | Maroni | May 22, 1951 |
| 2,692,359 | Ehret | Oct. 19, 1954 |

OTHER REFERENCES

Theory and Application of Industrial Electronics, Cage and Bache, McGraw-Hill, 1951, page 46, Figs. 3–5.

Electron Tube Circuits, Seely, page 126, Figs. 7—5, McGraw-Hill, 1950.